Patented Feb. 27, 1940

2,191,656

UNITED STATES PATENT OFFICE 2,191,656

VULCANIZATION ACCELERATOR

Marion W. Harman, Nitro, W. Va., assignor to Monsanto Chemical Company, St. Louis, Mo., a corporation of Delaware No Drawing. Application October 16, 1937,
Serial No. 169,473

14 Claims. (Cl. 260—789)

The present invention relates to a new class of rubber vulcanization accelerators and to rubber vulcanized in the presence thereof. More particularly it relates to the condensation products of mercapto aryl thiazoles and primary amines.

In accordance with the preferred embodiment of the present invention it has been discovered that mercapto aryl thiazoles, as for example mercaptobenzothiazole, mercaptonaphthothiazole, mercaptophenylbenzothiazole, or substituted mercapto aryl thiazoles, for example mercaptomethylbenzothiazole, mercaptochlorbenzothiazole, and mercaptoaminobenzothiazole may be condensed with primary amines of the class which is exemplified by cyclohexyl and benzyl amines to produce a new class of rubber vulcanization accelerators.

Examples of the preferred class of materials are benzyl amino thio benzothiazole; cyclohexylamino thio benzothiazole; p-methyl cyclohexylamino thio benzothiazole; cyclohexylamino thio 4 phenyl benzothiazole; benzyl amino thio 4 phenyl benzothiazole; p-ethyl cyclohexylamino thio benzothiazole; hexahydrobenzylamino thio benzothiazole; and cyclohexylamino thio 4 methyl benzothiazole.

The following are to be understood as illustrative embodiments of the invention and not limitative of the scope thereof.

EXAMPLE I

Substantially 47.2 parts by weight (substantially 0.25 molecular proportion) of sodium mercaptobenzothiazole dissolved in water to form a solution of substantially 394 c. c. in volume was mixed with 25 parts by weight (substantially 0.25 molecular proportion) of cyclohexylamine. A second solution was prepared by mixing 35.2 parts by weight (substantially 2.75 molecular proportions) of 30% by volume hydrogen peroxide and 94.5 c. c. (substantially 0.115 molecular proportion) of 2.437N sulfuric acid. This latter solution containing the peroxide was added with good stirring to the first solution during a period of 25–30 minutes, the temperature of the reaction mixture being maintained at 45–55° C. Stirring was continued for a short time after the addition of the peroxide solution and then 30 c. c. of 10% caustic soda (substantially 0.075 molecular proportion) was added and the mixture ball milled for 4 hours, filtered, washed free of alkali and dried at 60° C. A good yield of cyclohexylamino 2 thio benzothiazole was obtained. The reaction involved is as follows:

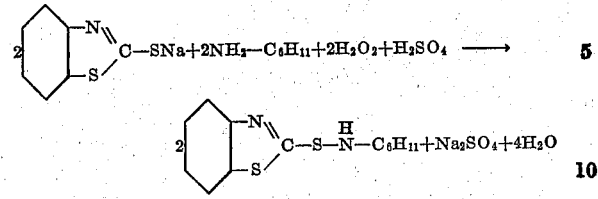

The cyclohexylamino 2 thio benzothiazole melted at 103–104° C. Analysis for nitrogen and sulfur gave the following results:

|  | Theory (calculated for $C_{13}H_{16}N_2S_2$) | Found |
|---|---|---|
|  | Percent | Percent |
| Nitrogen | 10.69 | 10.55 |
|  |  | 10.58 |
| Sulfur | 24.26 | 24.40 |
|  |  | 24.42 |

The cyclohexylamino 2 thio benzothiazole described above was incorporated in the usual manner in a typical rubber gum stock comprising

| | |
|---|---|
| Pale crepe | 100 |
| Zinc oxide | 8 |
| Sulfur | 2.5 |
| Stearic acid | 0.5 |
| Cyclohexylamino 2 thio benzothiazole | 0.5 |

The rubber stock thus compounded was vulcanized and the cured rubber product tested with the following results.

Table I

| Cure | | Modulus of elasticity in lbs./in.² at elongations of— | | Tensile at break in lbs./in.² | Ult. elong., percent |
|---|---|---|---|---|---|
| Mins. | Lbs. steam pressure | 500% | 700% | | |
| 45 | 20 | 596 | 2410 | 3200 | 755 |
| 60 | 20 | 851 | 3320 | 3740 | 725 |
| 90 | 20 | 1025 | 3900 | 3900 | 700 |

From the data set forth in Table I it is readily apparent that the new and preferred class of accelerators, for example cyclohexylamino 2 thio benzothiazole are markedly strong in their accelerating effect, as 0.5% of accelerator based on the rubber content gives substantially as high a rate of cure as 1% of most of the commercial accelerators. Moreover, the above uncured stock showed no "set-ups" or pre-vulcanization when tested with a Williams plastometer described by Williams, Industrial and Engineering Chemistry for 1924 (vol. 16, p. 362—see also Krall ibid., vol. 16, p. 922) after heating for 60 and 120 minutes at 200° F.

Cyclohexylamino 2 thio benzothiazole was also employed in a typical rubber tread stock comprising

| | |
|---|---|
| Smoked sheets | 100 |
| Carbon black | 50 |
| Zinc oxide | 5 |
| Sulfur | 3 |
| Stearic acid | 3 |
| Pine tar | 2 |
| p-amino diphenyl-acetone condensation product | 1 |
| Cyclohexylamino 2 thio benzothiazole | 0.75 |

The compounded rubber stock on vulcanizing and testing gave the following results for the unaged stock.

*Table II*

| Cure | | Modulus of elasticity in lbs./in.² at elongations of— | | Tensile at break in lbs./in.² | Ult. elong., percent |
|---|---|---|---|---|---|
| Mins. | Lbs. steam pressure | 200% | 400% | | |
| 45 | 30 | 1170 | 3230 | 4475 | 540 |
| 60 | 30 | 1220 | 3335 | 4435 | 520 |
| 75 | 30 | 1220 | 3335 | 4410 | 515 |
| 90 | 30 | 1290 | 3485 | 4370 | 500 |

The following results were obtained after air bomb aging the above described vulcanized stock at 220° F. for 9 hours with 50 lbs. air pressure.

*Table III*

| Cure | | Modulus of elasticity in lbs./in.² at elongations of— | | Tensile at break in lbs./in.² | Ult. elong., percent |
|---|---|---|---|---|---|
| Mins. | Lbs. steam pressure | 200% | 400% | | |
| 45 | 30 | 1315 | 3145 | 3730 | 500 |
| 60 | 30 | 1350 | 3360 | 3700 | 430 |

The data set forth in Tables II and III show that the new class of accelerators, for example cyclohexylamino 2 thio benzothiazole are likewise remarkably efficient in rubber tread stocks.

The flex cracking resistance of the above described vulcanized tread stock was determined on a flexing machine as set forth by L. V. Cooper, Analytical Edition of Industrial and Engineering Chemistry, vol. 2, No. 4, 1930, pages 391–394 and both the unaged stock and the stock after 7 days aging in the Geer oven at 70° C., were found to be markedly resistant to flex cracking.

EXAMPLE II

Substantially 47 parts by weight (substantially 0.25 molecular proportion) of sodium mercaptobenzothiazole dissolved in substantially 350 parts by weight of water was mixed with 27 parts by weight (substantially 0.25 molecular proportion) of benzyl amine. A second solution was prepared comprising 35.2 parts by weight (substantially 0.275 molecular proportion) of 30% by volume hydrogen peroxide and 93 c. c. (substantially 0.115 molecular proportion) of 2.484N sulfuric acid. The peroxide solution was added over a period of thirty minutes to the well agitated benzyl amine-sodium mercaptobenzothiazole solution, keeping the temperature of the mixture at 45–50° C. Following the addition stirring was continued for 10 minutes, 30 c. c. of 10% caustic soda solution added, and the charge ball milled for 4 hours. The colorless reaction product was filtered off, washed free of alkali and dried at 60° C. The melting point of the dried material was 114–116° C. and was obtained in a good yield. After recrystallizing from alcohol the melting point was 117–118°. The above described benzyl amino 2 thiobenzothiazole was incorporated in a typical rubber stock comprising

| | |
|---|---|
| Pale crepe | 100 |
| Zinc oxide | 5 |
| Sulfur | 3 |
| Stearic acid | 1 |
| Benzylamino 2 thio benzo-thiazole | 0.75 |

After vulcanizing the cured rubber product was found to possess the following tensile and modulus characteristics.

*Table IV*

| Cure | | Modulus of elasticity in lbs./in.² at elongations of— | | | Tensile at break in lbs./in.² | Ult. elong., percent |
|---|---|---|---|---|---|---|
| Mins. | Lbs. steam pressure | 300% | 500% | 700% | | |
| 45 | 20 | 130 | 325 | 1310 | 2450 | 810 |
| 60 | 20 | 200 | 685 | 2900 | 3800 | 730 |
| 90 | 20 | 280 | 1050 | 4050 | 4150 | 710 |

The above data show that benzyl amino 2 thiobenzothiazole exhibits the desirable properties typical of the preferred class of materials.

EXAMPLE III

Substantially 47 parts by weight (substantially 0.25 molecular proportion) of the sodium salt of 2-mercapto 4-methyl benzothiazole, dissolved in substantially 400 parts by weight of water, was mixed with 25 parts by weight (substantially 0.25 molecular proportion) of cyclohexlamine. A second solution was prepared comprising 35.2 parts by weight (substantially 0.275 molecular proportion) of 30% by volume hydrogen peroxide and 93 c. c. (substantially 0.115 molecular proportion) of 2.484N sulfuric acid. The peroxide solution was added over a period of thirty minutes to the well agitated cyclohexylamine-sodium mercapto 4-methyl benzothiazole solution. After stirring for ten minutes longer the product was separated by decanting off the upper aqueous layer and taken up in 250 c. c. of ether, washed thrice with 200 c. c. portions of 2% caustic soda solution, then repeatedly with distilled water. The extract was dried over anhydrous sodium sulfate, filtered, and the solvent evaporated on a steam bath—the last traces under reduced pressure. The product consisted of a brown viscous syrup. The cyclohexylamino 2 thio 4 methyl benzothiazole so obtained was incorporated in a typical rubber stock comprising

| | |
|---|---|
| Pale crepe | 100 |
| Zinc oxide | 5 |
| Sulfur | 3 |
| Stearic acid | 1 |
| Cyclohexylamino 2 thio 4-methyl benzothiazole | 0.75 |

After vulcanizing the cured rubber product was found to possess the modulus and tensile characteristics given in Table V.

Table V

| Cure | | Modulus of elasticity in lbs./in.² at elongations of— | | | Tensile at break in lbs./in.² | Ult. elong., percent |
|---|---|---|---|---|---|---|
| Mins. | Lbs. steam pressure | 300% | 500% | 700% | | |
| 60 | 20 | 100 | 190 | 525 | 1700 | 880 |
| 90 | 20 | 190 | 560 | 2425 | 3400 | 765 |

Further examples of the preferred class of materials are obtainable by utilizing the principles hereinbefore set forth. For example the sodium salt of 2-mercapto 4 phenyl benzothiazole on condensing with cyclohexylamine forms a condensation product falling within the scope of this invention and the condensation product so obtained when incorporated in a typical rubber stock exhibits the desirable properties characteristic of the preferred class of materials.

If desirable the new and improved class of accelerators may be employed in conjunction with basic nitrogen containing accelerators. Thus on employing cyclohexylamino thio benzothiazole in conjunction with diphenyl guanidine the former is thereby activated and the accelerating action increased. The test data also revealed that diphenyl guanidine phthalate used in conjunction with one of the preferred class of accelerators gives an especially valuable accelerator combination. Other basic nitrogen containing accelerators as for example triphenyl guanidine and di ortho tolyl guanidine may be similarly employed. As a specific example of the desirable properties of the preferred class of materials when activated by a basic nitrogen containing accelerator, the following dry heat stocks were compounded:

| | Stock A | Stock B |
|---|---|---|
| Pale crepe | 100 | 100 |
| Zinc oxide | 5 | 5 |
| Whiting | 60 | 60 |
| Sulfur | 2 | 2 |
| Laurex | 0.25 | 0.25 |
| Sunproof | 0.25 | 0.25 |
| Cyclohexylamino thio benzothiazole | 1.0 | 1.0 |
| Diphenyl guanidine | | 0.3 |

The stocks so compounded were cured in dry heat at 260° F. and the following modulus and tensile properties found on testing the cured stock.

Table VI

| Stock | Dry heat cure | | Modulus of elasticity in lbs./in.² at elongations of— | | Tensile at break in lbs./in.² | Ult. elong., percent |
|---|---|---|---|---|---|---|
| | Mins. | Temp. °F. | 300% | 500% | | |
| B | 45 | 260 | 520 | 1760 | 2890 | 595 |
| A | 60 | 260 | 424 | 1430 | 2730 | 620 |
| B | 60 | 260 | 505 | 1675 | 2840 | 595 |

The above data show that the preferred class of materials, for example cyclohexylamino thio benzothiazole, may be used in conjunction with basic nitrogen containing accelerators, for example diphenyl guanidine, to produce an improved accelerator combination and more particularly a combination in which the preferred class of materials are strongly activated by the basic nitrogen containing accelerator.

Other methods of preparing the preferred class of accelerators may be employed than those hereinbefore set forth. As is apparent to those skilled in the art other means of effecting the oxidation may be utilized. The invention is not limited by the temperatures and reaction times mentioned specifically and other oxidizing agents than hydrogen peroxide may be employed. Furthermore, there are other methods of isolation and purification of the product. For example the ball milling of the reaction mixture with caustic soda as described in Example I has been found to be an effective and practical means of purifying the product and driving the reaction to completion, but it is likewise possible to dissolve the product in an organic solvent, as for example ether, and thus remove insoluble impurities. Where convenient or desirable a recrystallization step may be introduced and the product recrystallized from an organic solvent, as for example alcohol. The residue after removing the reaction product may be worked up to recover any unreacted mercaptoarylthiazole. Thus the filtrate in Example I was acidified and unreacted mercaptobenzothiazole filtered off.

The present invention is limited solely by the appended claims.

What is claimed is:

1. The process of vulcanizing rubber which comprises heating rubber and sulfur in the presence of a mixture of diphenyl guanidine and cyclohexylamino 2 thio benzothiazole.

2. The process of vulcanizing rubber which comprises heating rubber and sulfur in the presence of a mixture of diphenyl guanidine phthalate and cyclohexylamino 2 thio benzothiazole.

3. The process of vulcanizing rubber which comprises heating rubber and sulfur in the presence of cyclohexylamino 2 thio benzothiazole.

4. The process of vulcanizing rubber which comprises heating rubber and sulfur in the presence of cyclohexylamino 2-thio 4-phenyl benzothiazole.

5. The process of vulcanizing rubber which comprises heating rubber and sulfur in the presence of a compound possessing the formula R—S—NH—$R_1$, wherein R represents an arylene thiazyl group and $R_1$ represents a hydrocarbon radical selected from a group consisting of cyclohexyl, benzyl and hexahydrobenzyl radicals.

6. The process of vulcanizing rubber which comprises heating rubber and sulfur in the presence of a compound possessing the formula R—S—NH—$R_1$, wherein R represents an arylene thiazyl group and $R_1$ represents a cyclohexyl hydrocarbon group.

7. The process of vulcanizing rubber which comprises heating rubber and sulfur in the presence of a compound possessing the formula R—S—NH—$R_1$ wherein R represents a benzothiazyl group and $R_1$ represents a cyclohexyl hydrocarbon group.

8. The vulcanized rubber product obtained by heating rubber and sulfur in the presence of a mixture of diphenyl guanidine and cyclohexylamino 2-thio benzothiazole.

9. The vulcanized rubber product obtained by heating rubber and sulfur in the presence of a mixture of diphenyl guanidine phthalate and cyclohexylamino 2-thio benzothiazole.

10. The vulcanized rubber product obtained by heating rubber and sulfur in the presence of cyclohexylamino 2-thio benzothiazole.

11. The vulcanized rubber product obtained by heating rubber and sulfur in the presence of cyclohexylamino 2-thio-4-phenyl-benzothiazole.

12. The vulcanized rubber product obtained by heating rubber and sulfur in the presence of a compound possessing the formula R—S—NH—$R_1$, wherein R represents an arylene thiazyl group and $R_1$ represents a hydrocarbon radical selected from a group consisting of cyclohexyl, benzyl and hexahydrobenzyl radicals.

13. The vulcanized rubber product obtained by heating rubber and sulfur in the presence of a compound possessing the formula R—S—NH—$R_1$, wherein R represents an arylene thiazyl group and $R_1$ represents a cyclohexyl hydrocarbon group.

14. The vulcanized rubber product obtained by heating rubber and sulfur in the presence of a compound possessing the formula R—S—NH—$R_1$ where R represents a benzothiazyl group and $R_1$ represents a cyclohexyl hydrocarbon group.

MARION W. HARMAN.